May 18, 1948.  R. S. CHILDS  2,441,869
LINEAR MOVEMENT SELF-SYNCHRONOUS SYSTEM
Filed June 21, 1943    2 Sheets-Sheet 2
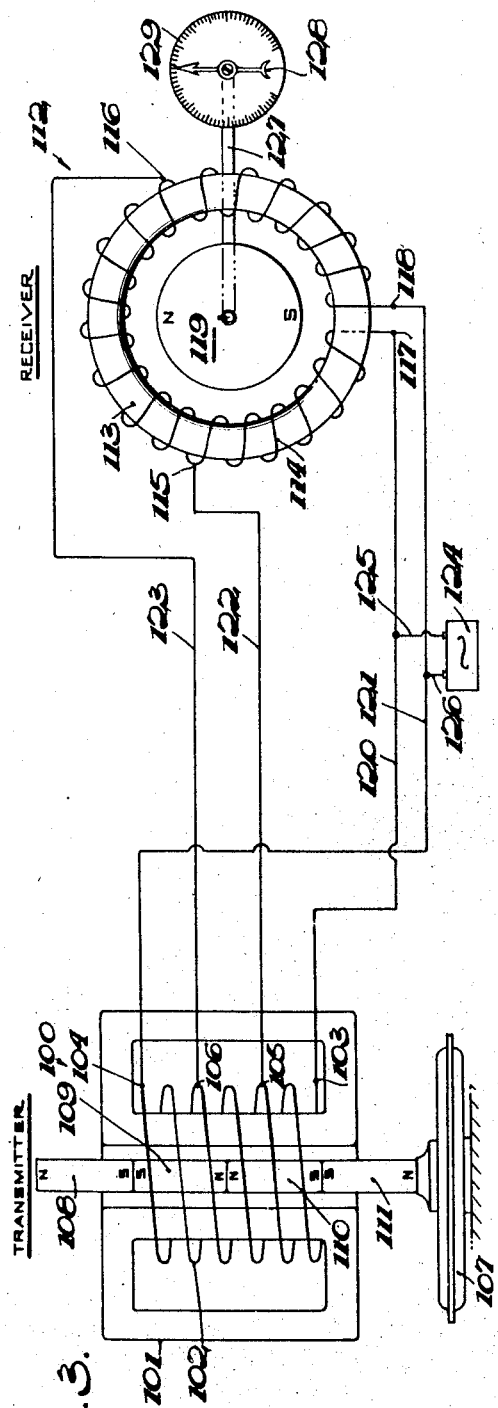
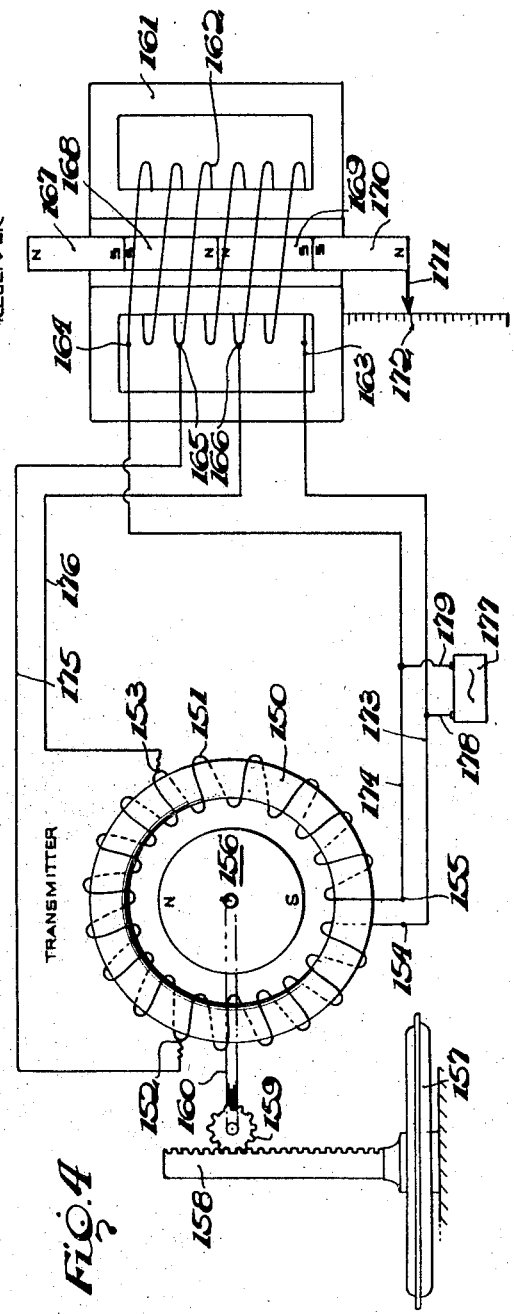
INVENTOR.
Robert S. Childs
BY
ATTORNEY Patented May 18, 1948

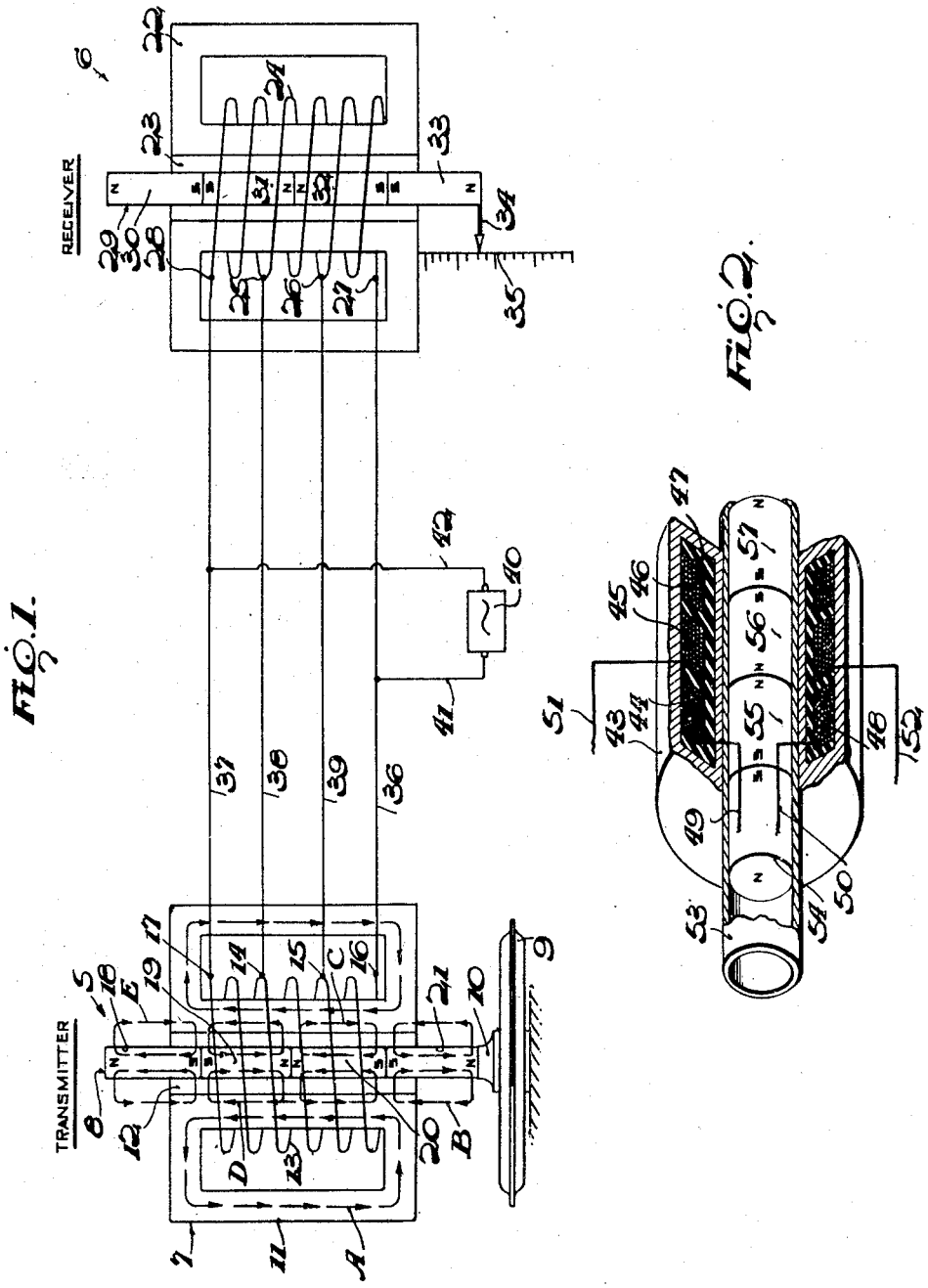

2,441,869

UNITED STATES PATENT OFFICE 2,441,869

LINEAR MOVEMENT SELF-SYNCHRONOUS SYSTEM

Robert S. Childs, Englewood, N. J., assignor to Bendix Aviation Corporation, Teterboro, N. J., a corporation of Delaware Application June 21, 1943, Serial No. 491,682

12 Claims. (Cl. 318—23)

The present invention relates to self-synchronous systems, and more particularly to novel and improved means for reproducing motion, whether it be translational or angular, at a remote point for indicating and/or control purposes.

In known telemetric systems, such as that illustrated by U. S. Patent No. 2,269,602, issued to W. A. Reichel on January 13, 1942, and assigned to the assignee of the present invention, it has been necessary, in order to transmit and reproduce longitudinal movement, to provide a relatively complicated linkage system between the transmitter unit of the system and the member responding to a condition being measured so that translational motion of the member could be converted into rotational motion of the transmitter rotor at a value corresponding to the change in the value being measured. Obviously, to procure an accurate measure of the change in the condition being measured the linkage had to be precise requiring a great deal of time and effort to design and properly correlate the various parts of the linkage to accomplish the purpose desired. Moreover, where it was desired to reproduce at a remote point, various engine functions in aircraft, such as engine manifold pressure, oil pressure, etc., the required linkages were difficult to install.

An object of the present invention, therefore, is to provide a novel telemetric system in which a member, responding to a change in a condition being measured, is directly connected to the movable portion of a transmitter unit so that the motion imparted to the transmitter is accurately reproduced at a receiver thereby overcoming the disadvantages occurring with the use of known intermediate linkage systems for this purpose.

Another object of the invention is to provide a novel electromagnetic unit adapted for use in telemetric systems which may be utilized either as the transmitter unit in such a system or as the receiver unit thereof, or wherein two such units may be used, one acting as the transmitter unit and the other as the receiver unit.

A further object of the invention is to provide a novel electromagnetic unit for use in telemetric systems in which the normally stationary member is formed to extend longitudinally and in which the movable element is mounted for longitudinal movement relative to the stationary member as distinguished from the usual annular stationary members and related rotatable rotors of the prior art.

Another object of the invention is to provide a novel telemetric system which is adapted to transmit and reproduce longitudinal motion and in which the member moving longitudinally in response to a condition being measured is secured directly to the movable portion of the transmitter.

A still further object is to provide a novel telemetric system utilizing two dissimilar units, either of which may act as a transmitter or a repeater of motion, one unit having a longitudinally movable portion and the other unit having a rotatably movable portion.

Another object is to provide a novel telemetric system utilizing two similar units, one of which acts as a transmitter of motion and the other of which acts as a receiver and reproducer of motion, both units being provided with longitudinally movable portions.

A further object of the invention is to provide a novel self-synchronous system having a novel unit therefor which may act either as a transmitter of motion, a repeater and reproducer of motion, or both.

A still further object of the invention is to provide a novel and improved system for reproducing motion at a remote point and embodying a novel electromagnetic unit which comprises a relatively stationary wound member cooperating with a longitudinally movable magnetic member having no windings thereon, thereby eliminating brushes, slip-rings and commutators, the movable member, furthermore, being adapted for direct connection to a device responding to variations in a condition being measured.

The above and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for purposes of illustration only, and are not to be construed as defining the limits of the invention.

In the drawings,

Figure 1 is a more or less diagrammatic illustration of one embodiment of the invention as applied to the production of a remote indication by a pressure responsive device, for example, and shows a novel unit acting as a transmitter and a like unit acting as a receiver with their magnetic and electric circuits and connections;

Figure 2 is a longitudinal section view of one form of the novel unit of Figure 1;

Figure 3 is a view similar to Figure 1 of a second embodiment of the present invention; and Figure 4 is a view similar to Figures 1 and 3 of a third embodiment of the present invention.

Referring now to the drawings and more particularly to Figure 1 thereof, the novel apparatus of the invention comprises, in the form shown, a novel transmitter unit 5 and a like distant receiver unit 6 electrically connected to the transmitter in a manner to presently appear. Only one receiver unit has been shown for the purpose of simplicity but it will be apparent that two or more receiver units may be connected to transmitter unit 5 whereby the motion at the transmitter may be reproduced at two or more distant points.

Transmitter unit 5 comprises a relatively stationary stator having a core 7, and a movable armature member 8 cooperating therewith, the latter member being adapted for longitudinal motion relative to the stator in response to the expansion and contraction of a condition responsive element 9, for example, to which the movable member is directly secured through the intermediary of a suitable post 10. Stator core 7 is formed of highly permeable magnetic material and is constructed in the nature of a longitudinal member 11 provided with a central air gap 12 therein, and having wound thereon a single coil 13 which is tapped at two or more points as, for example, at points 14 and 15 intermediate the ends 16 and 17 of the coil, the ends and the tapped points being spaced apart one-third the distance of the whole coil, i. e., tapped point 15 is spaced one-third the distance of the coil from end 16 and tapped point 14 is spaced two-thirds the distance of the coil from end 16.

Arranged within air gap 12 for longitudinal movement relative to stator core 7 and coil 13 and in magnetic relation therewith is armature member 8 which is in the form of a series of aligned magnets 18, 19, 20 and 21. The aligned magnets are mounted one above the other with a like pole of one magnet adjacent a like pole of a second magnet for a purpose to presently appear. Each magnet provides a uni-directional magnetic flux which enters core 7 in the manner indicated by the arrows in Figure 1.

Receiver unit 6, shown in Figure 1, is located at the remote point and also comprises a stator having a longitudinal core member 22 of highly permeable magnetic material provided with a central air gap 23 therein, and having wound thereon a single coil 24 which is tapped at two or more points as, for example, at points 25 and 26 intermediate the ends 27 and 28 of the coil, the ends and tapped points of the coil being spaced apart in the same manner as the corresponding coil of Figure 1, i. e., tapped point 26 is one-third the distance of the entire coil from its end 27 and tapped point 25 is two-thirds the distance of the entire coil from its end 27.

Mounted for longitudinal movement relative to core member 22 within air gap 23 is an armature member 29 which is identical with movable armature member 8 of Figure 1 and consists of a series of aligned magnets 30, 31, 32 and 33 which are mounted one above the other with a like pole of one magnet adjacent a like pole of a second magnet for a purpose to be presently described. One end of member 29 may be provided with a suitable indicator or pointer 34 superimposed for longitudinal motion relative to a scale 35.

The ends 16 and 17 of coil 13 of the transmitter stator are electrically connected with the ends 27 and 28 of coil 24 of the receiver stator by means of suitable conductors 36 and 37, respectively, while the tapped points 14 and 15 of coil 13 are electrically connected to corresponding tapped points 25 and 26 of coil 24 by means of suitable conductors 38 and 39, respectively.

Both the transmitter stator coil 13 and the receiver stator coil 24 are energized by either a single phase alternating current or a pulsating direct current from a suitable source 40 connected to conductors 36 and 37 by means of leads 41 and 42, respectively. The current source may be a generator, alternator, an interrupter or a vacuum tube oscillator, for example.

With the foregoing arrangement it will be apparent that tapped points 14, 15 of coil 13 and tapped points 25, 26 of coil 24 define, in effect, multi-circuit connections, while the ends 16, 17 of coil 13 and ends 27, 28 of coil 24 constitute single phase connections. In other words, the entire length of each coil is a single phase winding while the tapped sections divide each coil into sections that are one hundred twenty electrical degrees (120°) apart. Thus coils 13 and 24 function as auto-transformers having input terminals 16, 17 and 27, 28 and output terminals 14, 15 and 25, 26.

With the energization of coils 13 and 24 of the transmitter and receiver stators, through their ends 16, 17 and 27, 28 from source 40, voltages are generated in the tapped sections of the coils due to the periodic reversal of the flux produced in stator cores 7 and 22 by the periodically varying current flowing in coils 13 and 24 from source 40. Since the electromagnetic action within the receiver is the same as that within the transmitter, such action will be described, for purposes of clarity, only in connection with the transmitter. During one-half cycle of the exciting current from source 40, the periodically varying flux (designated by the letter A in Figure 1) opposes within the core the uni-directional flux of every second magnet of member 8, i. e., the flux of magnets 18 and 20 designated by the letters C and E in Figure 1 and, at the same time, aids the uni-directional flux of the remaining magnets 19 and 21, designated by the letters B and D in the same figure. During the other half cycle of the exciting current the periodically varying flux, because it has reversed its direction at this point, aids the uni-directional flux C and E produced by magnets 18 and 20 and, at the same time, opposes the uni-directional flux B and D of magnets 19 and 21. The voltages thus generated in the sections of coils 13 and 24 by the flux variation in cores 11 and 22 are even harmonics of the fundamental frequency of the exciting current.

When a condition of synchronism prevails, the even harmonic voltages in the sections of coil 13 are substantially equal to the even harmonic voltages in the sections of coil 24 but are in an opposite direction and, as a result, there is no secondary current flow in conductors 36, 37, 38 and 39 by which sections of coil 13 of the transmitter are connected to the sections of coil 24 of the receiver. If, however, the movable member 8 of the transmitter is displaced longitudinally by element 9, the secondary voltages in coil 13 will no longer be equal to the secondary voltages in coil 24, and current will flow in conductors 36, 37, 38 and 39 connecting the sections of coil 13 and the sections of coil 24, thereby producing a resultant magnetic field at the receiver core 22, which reacts with the individual fields of the respective magnets of receiver member 29 to produce a torque which displaces longitudinally member 29 and brings it into positional agreement with member 8 of the transmitter. Movement of receiver member 29 actuates pointer 34 relative to scale 35 to indicate the amount of displacement of transmitter member 8 by element 9. Thus, the motion of the transmitter is reproduced at a distant point by the receiver member 29 and the amount of change in the condition being measured is repeated and indicated at the remote point by pointer 34.

Condition responsive element 9 has been shown in Figure 1, as comprising a single diaphragm, it may, however, comprise a plurality of such diaphragms or it may constitute a bellows of any known type so that any variation in a pressure or other condition being measured at the transmitter will actuate the pressure sensitive element or elements to expand or contract along a longitudinal axis. In this manner the movable member or armature of the transmitter may be connected directly to the pressure responsive element, thereby overcoming all intermediary linkage and gears previously relied upon.

The transmitter 5 has been shown diagrammatically in Figure 1, however, one form that a practical embodiment of such unit may take is shown in Figure 2. The stator, there shown, comprises a cylindrical member 43 formed of highly permeable magnetic material such as, "Mumetal," for example, provided with three substantially similar and longitudinally aligned compartments 44, 45 and 46, having, if desired, a suitable confining liner 47 therein. Compartments 44, 45 and 46 receive a single coil 48, consisting of a plurality of turns, having input leads 49, 50 and two tapped leads, formed in a manner similar to that described in connection with coil 13 of Figure 1, connected with leads 51 and 52.

Stator member 43 is provided with a central longitudinal opening for receiving therein a tubular sleeve 53 adapted for longitudinal motion relative to the stator. Sleeve 53 is hollow and retains a series of aligned magnets 54, 55, 56 and 57 which are rigidly secured within the sleeve and so arranged that a like pole of the first magnet is adjacent a like pole of a second magnet, etc.

With the energization of coil 48, the periodically varying flux due to the exciting current, traverses the cylindrical member 43, in the same manner as the flux A traverses core 7 shown in Figure 1. To prevent this periodically varying flux from using any of the magnets as a return path an electromagnetic shielding device is provided which comprises a sleeve 53 is preferably formed of copper so that any such flux will simply generate eddy currents in the sleeve, the currents, in turn, generating local magnetic fields to neutralize the undesirable portion of the varying flux.

In the form of the transmitter unit of Figure 2, four magnets 54, 55, 56 and 57 have been shown within sleeve 53, however, the unit would operate as well if only every second magnet were provided, i. e., if only magnets 54 and 56 were retained. They would be spaced from each other by a single magnet length. In such a case the south pole of magnet 54 would face the space otherwise occupied by magnet 55 while the north pole of magnet 56 would face the south pole of magnet 55 as distinguished from the arrangement of like poles adjacent each other when all four magnets are used. Furthermore, the transmitter unit would likewise perform its intended function if only one magnet, say magnet 54, were used within sleeve 53. Whether one, two, three, four or more magnets are decided upon, the electromagnetic action within the transmitter and its operation is substantially the same as described in connection with transmitter unit 5 of Figure 1, i. e., the coaction of the periodically varying flux with the unidirectional magnetic field of one or more of the magnets generators secondary harmonics in the tapped coil sections, the value of the harmonics in each section varying with the displacement of sleeve 53 and its magnet or magnets.

In some cases it may be desired to convert the longitudinal motion at the transmitter into angular motion at the receiver and to this end the structure of Figure 3 is provided. The transmitter unit 100 of this figure is similar in all respects to unit 5 of Figure 1 and comprises a stator having a longitudinal core 101 provided with a central opening therein together with a single coil 102 wound thereon, having input leads 103, 104 and tapped points 105, 106, each being spaced from the other and its respective input end one-third the distance of the length of the coil. Mounted within the core opening for longitudinal movement relative to the stator in response to the contraction and expansion of a condition measuring element 107 is an armature member comprising a series of longitudinally aligned magnets 108, 109, 110 and 111.

The receiver unit 112, in this embodiment, is of the type disclosed in copending application Serial No. 410,343, filed September 10, 1941, now Patent No. 2,342,637, issued February 29, 1944, and assigned to the assignee of the present invention. Such unit comprises a stator and a rotor in cooperative relation with the stator, the stator consisting of a core 113 in the form of a laminated annular ring of highly permeable magnetic material, having wound thereon a single coil 114 which is tapped at two or more points, as for example, at points 115 and 116 intermediate the ends 117 and 118 of the coil, the ends and the tapped points being angularly spaced one hundred twenty degrees (120°) apart along the circumference of the core.

Arranged concentrically within stator core 113 of the receiver and in magnetic relation therewith and with coil 114 is a rotor 119 in the form of a magnetic disc, one-half of which constitutes the north pole and the other half of which constitutes the south pole. Rotatable magnet 119 thus provides a uni-directional magnetic flux which enters core 113 similar to the manner in which the flux of the armature magnets of the transmitter unit enters core 101.

The free ends 103 and 104 of transmitter coil 102 are electrically connected to ends 117 and 118 of the receiver coil 114 by means of leads 120 and 121 while the tapped points 105 and 106 of coil 102 are electrically connected with tapped points 115 and 116 of coil 114 by means of leads 122 and 123. Thus, tapped points 105, 106 and 115, 116 constitute, in effect, multi-circuit connections, while the ends 103, 104 and 117, 118 constitute single phase connections. Coils 102 and 114 function as autotransformers having input terminals 103, 104 and 117, 118 and output terminals 105, 106 and 115, 116. A suitable source 124 of pulsating or alternating current is connected across leads 120 and 121 by way of suitable conductors 125 and 126.

As explained above, due to the flow of exciting current through transmitter coil 102 from source 124 the periodically varying flux within the stator core coacts with the uni-directional magnetic field or fields of the magnet or magnets carried by the transmitter armature so that secondary harmonics are generated at tapped sections 105, 106 of coil 102. The same condition exists at the receiver unit, i. e., for one half cycle of the exciting current flowing in receiver coil 114, the periodically varying flux flowing within receiver core 113 opposes the uni-directional flux of magnetic rotor 119 in one half of the core and, at the same time, aids the uni-directional flux in the other half of the core, while during the other half cycle of the exciting current the periodically varying flux aids the uni-directional flux of rotor 119 in the first half of the receiver core and, at the same time, opposes the unidirectional flux in the other half of the core. The secondary voltages generated in the sections of coils 102 and 114 by the above described flux coaction in cores 101 and 113 are even harmonics of the fundamental frequency of the exciting current.

At a position of synchronism, i. e., when the longitudinally movable armature of the transmitter is in positional agreement with the receiver rotor, the even harmonics in the sections of the transmitter coil are substantially equal to the even harmonic voltages in the sections of the receiver coil but are in opposite directions, and as a result, there is no current flow in the interconnecting leads. As soon, however, as the value of the condition being measured changes, element 107 is caused to expand or contract moving the movable member or armature of the transmitter longitudinally relative to the stator whereby the secondary voltages in coil 102 will no longer be equal to the secondary voltages in the receiver coil and current will flow through the interconnecting leads producing a resultant magnetic field at receiver core 113 which reacts with the field of the receiver rotor to produce a torque which rotates the receiver rotor until it is brought into agreement with the movable armature of the transmitter. Rotor rotation is imparted through a suitable shaft 127 to a pointer 128 superimposed for movement over a scale 129. Thus, the amount of longitudinal motion imparted to the transmitter armature is reproduced and its value indicated by pointer 128 at the receiver.

By the use of more than four magnets at the transmitter armature, the system of Figure 2 can be designed so that pointer 128 of the repeater may be caused to swing for two or more complete revolutions relative to scale 129.

The reverse of the foregoing arrangement may be used as well and, as shown in Figure 4, the transmitter unit may be identical to the receiver unit of Figure 3, comprising a stator and a rotor inductively coupled therewith, the stator consisting of a core 150 in the form of a laminated annular ring of highly permeable magnetic material having wound thereon a single coil 151 which is tapped at two or more points as, for example, points 152 and 153 intermediate the ends 154 and 155, the ends and tapped points being angularly spaced apart one hundred twenty degree (120°) along the core. Cooperating with the stator and mounted concentrically therewith is a magnetic rotor 156 in the form of a disc which responds to the expansion and contraction of a condition responsive element 157, to which the rotor is connected by way of a toothed rack 158 carried by the element and engaging a gear 159 secured to a shaft 160 carrying the rotor.

The receiver unit of this embodiment is similar to the transmitter unit of Figure 3 and more particularly comprises a stator having a longitudinal core 161 provided with a central opening therein together with a single coil 162 wound thereon, having input leads 163 and 164 and tapped points 165 and 166, each being spaced apart from the other and the respective input ends one-third the distance of the length of the coil. Mounted within the core opening for longitudinal movement relative to the stator is an armature member comprising a series of longitudinally aligned magnets 167, 168, 169 and 170. Fastened to one end of the armature is a suitable pointer 171 adapted for longitudinal movement relative to a scale 172.

Ends 154 and 155 of the transmitter coil are interconnected to ends 163 and 164 by means of conductors 173 and 174 while the tapped points 152 and 153 are interconnected to tapped points 165 and 166 through conductors 175 and 176. Tapped points 152, 153 and 165, 166 constitute, in effect, polyphase connections, while the ends 154, 155 and 163, 164 constitute single phase connections. The transmitter and receiver coils function as auto-transformers, having input terminals 154, 155 and 163, 164 and output terminals 152, 153 and 165, 166. A source of pulsating or alternating current 177 is connected across leads 173, 174 by way of conductors 178 and 179.

It will now be apparent that any change in the condition being measured prompts element 157 to expand or contract thereby angularly displacing transmitter rotor 156. Rotor rotation causes a change in the value of the secondary voltages at sections 152 and 153 of coil 151 so that current flows through leads 173, 174, 175 and 176 and synchronism no longer exists. The resultant magnetic field at the receiver stator produces a torque urging the receiver armature in either direction until synchronism is reestablished. At the same time pointer 171 moves relative to scale 172 to indicate the value of the change in the condition being measured at the transmitter.

There is thus provided a novel and relatively simple apparatus for reproducing motion at a distant point for control purposes or indicating at that point the value of the change of a condition occurring at a different point. The apparatus involves a minimum number of parts, is small, compact and light in weight, which makes it possible to manufacture in large quantities at low cost, and makes it especially desirable for installation on aircraft for remote indication of engine temperature, fuel pressure, fuel level, oil pressure, etc., without the use of intricate linkage systems and gears between the element responding to the condition change and the armature of the novel electromagnetic unit.

Although several embodiments of the invention have been illustrated and described in detail, various changes and modifications in the construction and relative arrangement of the parts, which will now appear to those skilled in the art, may be made without departing from the scope of the invention. Reference is therefore to be had to the appended claims for a definition of the limits of the invention.

I claim:

1. An electromagnetic device for use as a transmitter and arranged for electrical connection to a remote receiver, comprising a stator having longitudinally extending relatively stationary core means of magnetically permeable material, an auto-transformer coil wound on said core means, said coil having connections for energization by a periodically varying current and having a plurality of other connections for connecting said coil to a corresponding plurality of connections of a coil of the remote receiver, and linear magnet means associated in magnetic relation with said core means and coil and movable longitudinally thereof.

2. An electromagnetic device adapted for use as a transmitter and arranged for electrical connection to a remote receiver, comprising a stator having a hollow substantially cylindrical core of magnetically permeable material, an auto-transformer coil wound on said core, said coil having connections for energization by a periodically varying current and having a plurality of other connections for connecting said coil to a corresponding plurality of connections of a coil of the remote receiver, and substantially cylindrical magnet means within and in magnetic relation with said core and coil and movable longitudinally thereof.

3. In combination, a transmitter comprising a first longitudinally extending relatively stationary core means of magnetically permeable material, a winding on said first core means having a plurality of connections intermediate its ends, a linearly movable magnet in influencing relation with said core means for inducing a magnetic flux therein, a receiver comprising a second longitudinally extending relatively stationary core means of magnetically permeable material, a winding on said second core means and also having a plurality of connections intermediate its ends, the connections of said first winding being electrically connected to the corresponding connections of said second winding, a source of periodically varying current connected to energize both of said windings, and a linearly movable magnet associated in magnetic relation with said second core means and winding for actuation by the reaction between its own field and the field produced by said second winding upon linear movement of the first magnet relative to said first core means.

4. In combination, a transmitter comprising a longitudinally extending relatively stationary core means of magnetically permeable material, a winding on said core means having a plurality of connections intermediate its ends, a movable and longitudinally extending magnetic member in influencing relation with said core means for inducing a magnetic flux therein, a receiver comprising an annular core member of magnetically permeable material, a winding on said second core and also having a plurality of connections intermediate its ends, the connections of said first winding being electrically connected to the corresponding connections of said second winding, a source of periodically varying current connected to energize both of said windings, and a rotatable magnet associated with said second core and winding for actuation by the reaction between its own field and the field produced by said second winding upon movement of said longitudinally extending magnetic member relative to said first core means.

5. In combination, a transmitter comprising annular core means of magnetically permeable material, a winding on said core means having a plurality of connections intermediate its ends, a rotatable magnet associated with said core means for inducing a magnetic flux therein, a receiver comprising a longitudinally extending relatively stationary core means of magnetically permeable material, a winding on said core means and also having a plurality of connections intermediate its ends, the connections of said first winding being electrically connected to the corresponding connections of said second winding, a source of periodically varying current connected to energize both of said windings, and a longitudinally movable magnetic member associated in magnetic relation with said second core means and winding for actuation by the reaction between its own field and the field produced by said second winding upon angular movement of the first magnet relative to said first core means.

6. In a system for repeating motion at a distant point produced by a condition responsive element mounted at another and different point, a transmitter comprising a longitudinally extending core means of magnetically permeable material, a winding on said core means having a plurality of connections intermediate its ends, a longitudinally movable magnet in influencing relation with said core means for inducing a magnetic flux therein and connected directly to said condition responsive element, a receiver comprising a second core means of magnetically permeable material, a winding on said second core means and also having a plurality of connections intermediate its ends, the connections of said first winding being electrically connected to the corresponding connections of said second winding, a source of periodically varying current connected to energize both of said windings, a movable magnet associated with said second core means and winding for actuation by the reaction between its own field and the field produced by said second winding upon longitudinal movement of the first magnet relative to said first core means, and means actuated by said second magnet.

7. In combination, a transmitter comprising a longitudinal core means of magnetically permeable material, coil means on said core means and having input and output connections, longitudinal magnet means in influencing relation with said core means for inducing a magnetic flux therein and movable longitudinally thereof, a receiver comprising an annular core means of magnetically permeable material, coil means on said annular core means and also having input and output connections, the connections of said first coil means being electrically connected to corresponding connections of said second coil means, a source of periodically varying current connected to certain corresponding connections of both of said coil means for energizing them, and rotatable magnet means associated coaxially in magnetic relation with said annular core means and the associated coil means for actuation by the reaction between its own magnetic flux and the flux produced by said second coil means upon longitudinal movement of said longitudinal magnet means relative to its longitudinal core means.

8. An electromagnetic inductive device designed for use as a telemetric transmitter or receiver and arranged for electrical connection to a remote device functioning respectively as a receiver or transmitter, said device comprising longitudinally extending relatively stationary core means of magnetically permeable material, coil means wound on said core means and having connections for energizing said coil means by a periodically varying current and for connecting said coil means to corresponding connections of a coil means of a remote device, and linear magnet means in influencing relation with said core means and linearly movable in the